United States Patent
Haimerl et al.

(10) Patent No.: US 10,266,042 B2
(45) Date of Patent: Apr. 23, 2019

(54) CONVERTIBLE VEHICLE HAVING A COVER FOR A LINKAGE EXIT OPENING

(71) Applicant: Webasto SE, Stockdorf (DE)

(72) Inventors: Alexander Haimerl, Stockdorf (DE); Heinrich Wüllrich, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 47 days.

(21) Appl. No.: 15/712,863

(22) Filed: Sep. 22, 2017

(65) Prior Publication Data
US 2018/0118009 A1 May 3, 2018

(30) Foreign Application Priority Data
Oct. 27, 2016 (DE) .......................... 10 2016 120 562

(51) Int. Cl.
*B60J 7/00* (2006.01)
*B60J 7/20* (2006.01)

(52) U.S. Cl.
CPC .................................... *B60J 7/203* (2013.01)

(58) Field of Classification Search
CPC . B60J 7/1265; B60J 7/145; B60J 7/146; B60J 7/202; Y10T 29/49622; Y10T 292/1082; B60K 15/04; B60K 15/0406; E05B 81/06; B60T 7/122
USPC ................................................. 296/107.08
See application file for complete search history.

(56) References Cited

U.S. PATENT DOCUMENTS

| | | | | |
|---|---|---|---|---|
| 5,209,544 A | * | 5/1993 | Benedetto | B60J 7/148 296/107.08 |
| 5,921,608 A | * | 7/1999 | Schmitt | B60J 7/203 296/107.08 |
| 6,644,715 B1 | * | 11/2003 | Bohnke | B60J 7/203 296/107.08 |
| 6,682,124 B1 | * | 1/2004 | Bohnke | B60J 7/203 296/107.08 |
| 7,178,852 B2 | * | 2/2007 | Obendiek | B60J 7/146 296/107.08 |
| 9,090,149 B1 | * | 7/2015 | Binfet | B60J 7/061 |
| 9,718,335 B2 | * | 8/2017 | Kopp | B60J 7/1265 |

(Continued)

FOREIGN PATENT DOCUMENTS

| | | |
|---|---|---|
| DE | 296 02 762 U1 | 6/1997 |
| DE | 10 2005 057 772 A1 | 6/2007 |
| EP | 0 769 401 B1 | 4/1997 |

*Primary Examiner* — Kiran B Patel
(74) *Attorney, Agent, or Firm* — Fitch, Even, Tabin & Flannery, LLP

(57) ABSTRACT

A convertible vehicle top displaceable between closed and storage positions, and which has a top linkage, which, on both sides with respect to a vertical longitudinal center plane of the vehicle, may extend through a linkage exit opening of a vehicle trim when the top is in the closed position, each of the linkage exit openings on both sides being provided with a cover, the cover having a panel which can be displaced between a cover position, in which it covers the linkage exit opening, and an open position, in which the linkage exit opening is open. Each cover can have a guiding device, which guides the respective panel on a curved track in the direction of the vehicle front and outward in the transverse direction with respect to the vertical longitudinal center plane of the vehicle when the panel is displaced from the cover position into the open position.

8 Claims, 4 Drawing Sheets

(56) References Cited

U.S. PATENT DOCUMENTS

| | | | |
|---|---|---|---|
| 2004/0061353 A1* | 4/2004 | Habacker | B60J 7/203 296/107.08 |
| 2004/0108748 A1* | 6/2004 | Obendiek | B60J 7/146 296/108 |
| 2004/0119317 A1* | 6/2004 | Wulf | B60J 7/146 296/121 |
| 2005/0062311 A1* | 3/2005 | Obendiek | B60J 7/146 296/107.18 |
| 2006/0043758 A1* | 3/2006 | Powell | B60J 7/203 296/107.08 |
| 2006/0186694 A1* | 8/2006 | Wagner | B60J 7/145 296/107.08 |
| 2007/0096500 A1* | 5/2007 | Corder | B60J 7/145 296/121 |
| 2007/0194596 A1* | 8/2007 | Heselhaus | B60J 7/1204 296/107.07 |
| 2008/0001426 A1* | 1/2008 | Condon | B60J 5/102 296/108 |
| 2008/0042467 A1* | 2/2008 | Bruder | B60J 7/026 296/108 |
| 2009/0085369 A1* | 4/2009 | Willard | B60J 7/1265 296/107.01 |
| 2010/0045077 A1* | 2/2010 | Gerhardt | B60J 7/026 296/220.01 |

\* cited by examiner

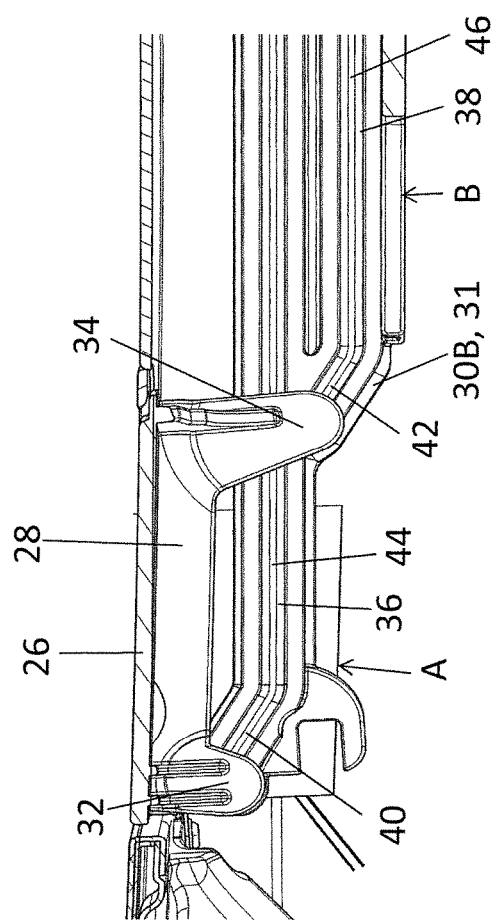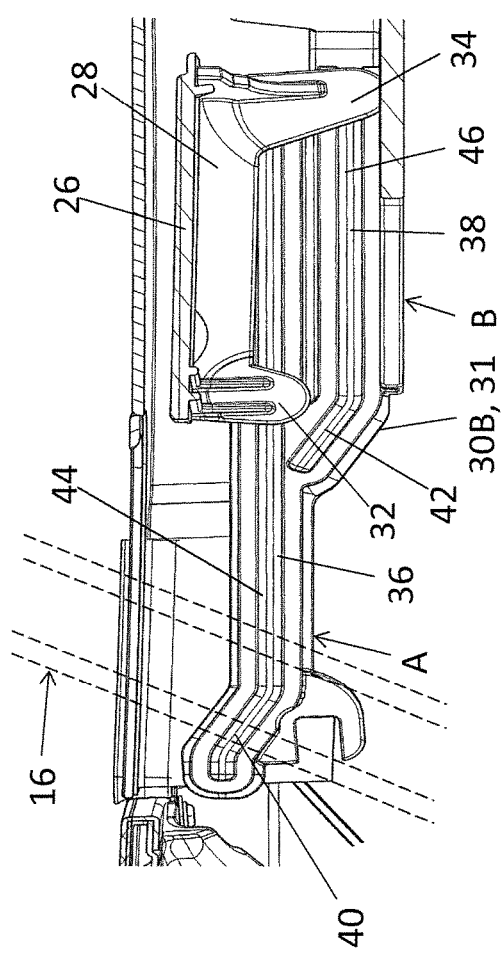

CONVERTIBLE VEHICLE HAVING A COVER FOR A LINKAGE EXIT OPENING

CROSS-REFERENCE TO RELATED APPLICATIONS

This application claims priority from German Patent Application Number DE 10 2016 120 562.1, filed Oct. 27, 2016, which is hereby incorporated herein by reference in its entirety.

FIELD

The invention relates to a convertible vehicle comprising a top according to the preamble of claim 1.

BACKGROUND

A convertible vehicle of this kind is known from practice and comprises a top which can be displaced between a closed position, in which the vehicle interior is covered, and a storage position, in which the vehicle interior is open toward the top. For actuation, the top comprises a top linkage, which has a linkage arrangement on both sides with respect to a vertical longitudinal center plane of the vehicle, each linkage arrangement extending through a linkage exit opening at the upper side of a vehicle trim when the top is in the closed position. When the top is in the storage position, in which it is typically accommodated in a rear-side top storage box of the vehicle in question, each of the linkage exit openings is closed by a cover. Each cover comprises a panel which can be displaced between a cover position, in which it fills the respective linkage exit opening, and an open position, in which the respective linkage exit opening is open. Depending on the embodiment, the panels can be designed in the manner of flaps or as sliding lid elements. Sliding panels are cost-efficient. Driving of the sliding panels can be realized by way of direct coupling with the top linkage. However, integrating the sliding panels into a vehicle trim without limiting the freedom of design as far as the trim is concerned has proven difficult so far.

The object of the invention is to provide a convertible vehicle of the kind mentioned above in which the covers for the linkage exit openings are adapted to the vehicle trim in an optimized manner.

This object is attained according to the invention by the convertible vehicle having the features of claim 1.

Thus, according to the invention, a convertible vehicle is proposed that has covers for linkage exit openings. For being displaced between their cover position and open position, the panels of the covers are each guided on a guiding device, which guides the panels on a curved track in the direction of the vehicle front and outward in the transverse direction with respect to the longitudinal center plane of the vehicle when the panels are displaced from the cover position into the open position. When the linkage exit openings are being opened, this trajectory of the panels allows the panels to be guided into a structural space of the vehicle structure that is not needed for other vehicle components. In particular, it is possible for the guiding devices to be arranged in such a manner that they are not located in a structural space that is taken up by the top linkage when the top is in the closed position. Additionally, the outward displacement of the panels in the transverse direction of the vehicle allows the passenger space in the area of a rear bench or of backseats of the vehicle in question to be wide and to not be limited by the displacement path of the panels. In this way, a lot of shoulder room can be realized for the passengers on the rear bench or backseats of the vehicle in question. The curved track in the vehicle transverse direction as defined by the guiding device also allows designing the panels with a smallest possible outline, which is defined only by the required minimal size of the linkage exit opening in relation to the top linkage. The displacement path and the arrangement of the panels in their open position have no impact on their dimensions.

The top of the convertible vehicle according to the invention can be a folding top, which has a foldable top cover, or a retractable hard top, which has rigid roof shells.

In a particular embodiment of the convertible vehicle according to the invention, the guiding device comprises two guide rails, each of which is engaged by a slider arrangement of the panel. In particular, the two guide rails run substantially parallel to each other and have a matching curvature.

In order for the panels to be guided in a positionally stable manner, each guide rail preferably has two guide tracks, each of which is engaged by a slider of the respective slider arrangement. In particular, each of the guide tracks has an inclined section in its rearward end portion, via which the respective panel is lowered below the plane of the vehicle trim so that the panel can be moved below the vehicle trim without collision.

The guide rails are preferably arranged in such a manner that a rearward section runs along the edges of the respective linkage exit opening that extend in the longitudinal direction of the vehicle.

In particular, the guide rails can have a course that follows an inner beltline of the vehicle trim. The inner beltline defines the shoulder room available to the passengers.

When being displaced from the cover position into the open position, the panels rotate because of the course of the guiding devices. In particular, the panels are turned by approximately 26° to 50° about a respective panel normal in relation to their closed position when they are in their open position The covers or the panels can each be provided with a drive device. Said drive device can drive the panels via a coupling link, a control rod, a drive cable or a gear mechanism. In particular, the drive device can also be formed by the top linkage itself, to which the coupling link, the control rod or the drive cable are linked.

It is contemplated that each panel is pre-tensioned in the direction of its respective cover position by means of a spring device or the like, thus being kept in the cover position when the top is in the storage position.

Moreover, it is contemplated that in order for the panels to be driven, the panels are displaced or pushed into the respective support position by links of the top linkage during displacement of the top into the closed position.

Other advantages and advantageous embodiments are apparent from the description, the drawing and the claims.

SUMMARY

An embodiment example of a convertible vehicle according to the invention is illustrated in a schematically simplified manner in the drawing and will be discussed in more detail in the following description.

BRIEF DESCRIPTIONS OF THE DRAWINGS

FIG. 5 shows a section along line V-V in FIG. 3;

FIG. 6 shows a section along line VI-VI in FIG. 4; and

DETAILED DESCRIPTION

Figure 1:
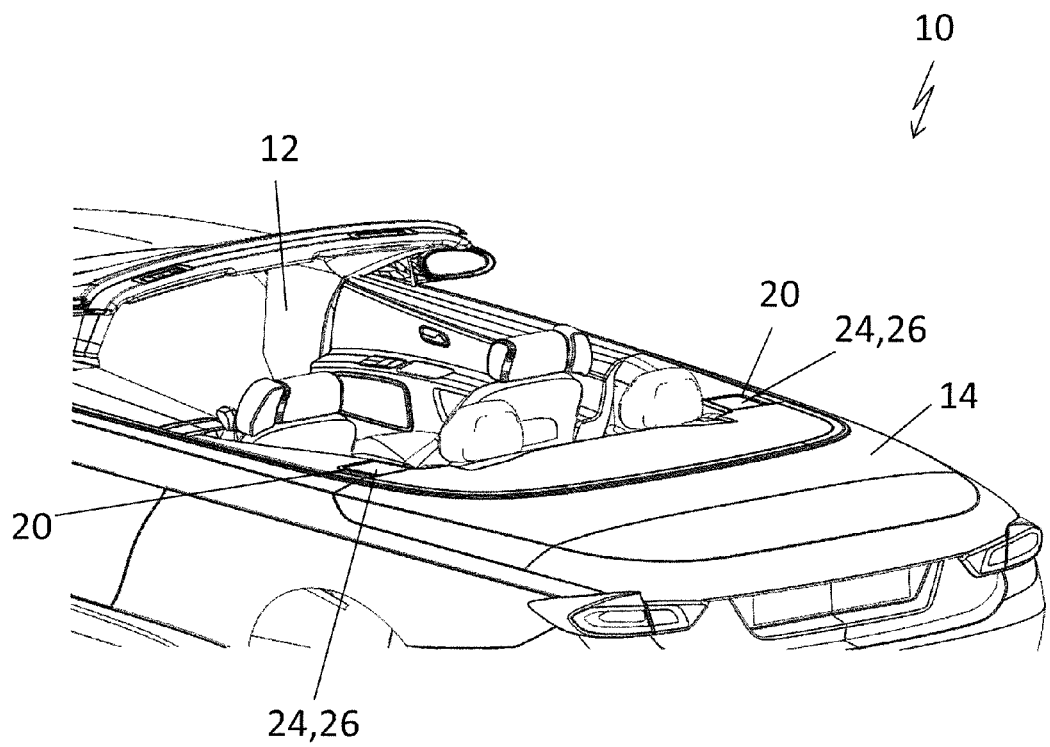
FIG. 1 shows a perspective sectional rear view of a convertible vehicle.
Figure 2:
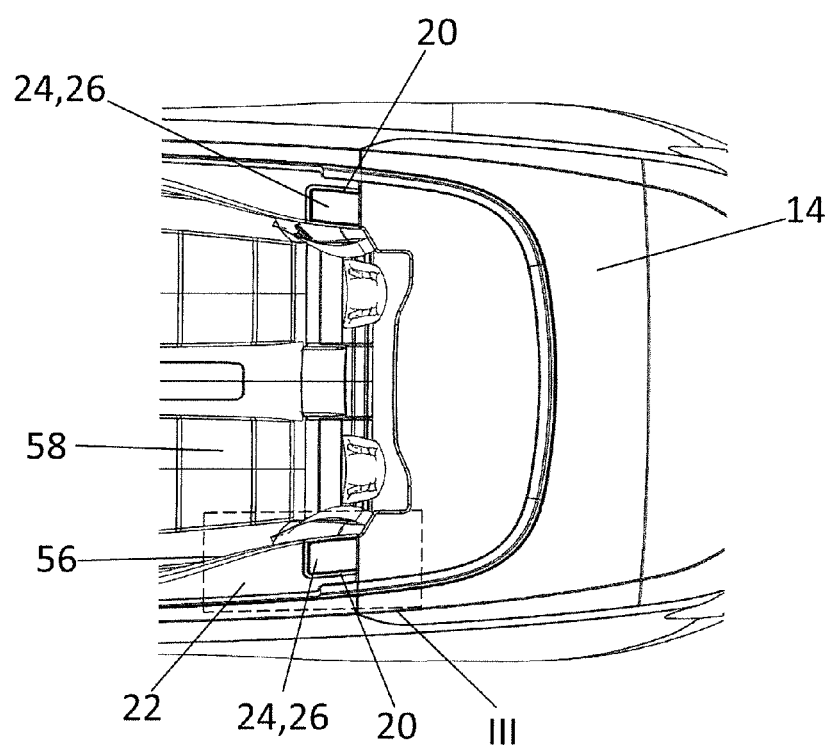
FIG. 2 shows a top view of a rear portion of the vehicle, in which linkage exit openings are formed.

FIGS. 1 and 2 show a convertible vehicle 10 that is provided with a folding top by means of which a vehicle interior 12 can be closed or opened at will. In the arrangement illustrated in the Figures, the folding top is accommodated in a rear-side top storage box, i.e. it is in its storage position. The top storage box can be closed by means of a top box lid 14.

Figure 7:
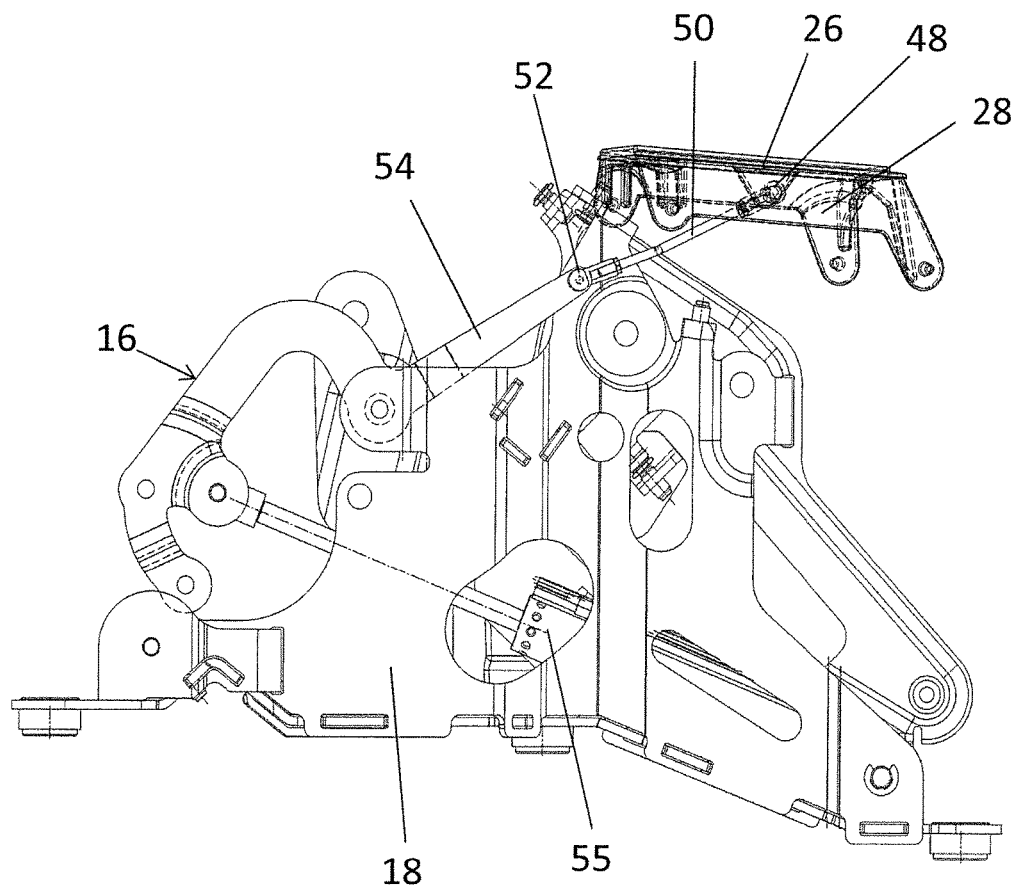
FIG. 7 shows a sectional illustration of a top linkage and how it is coupled to the cover for the linkage exit opening.

The folding top comprises a top linkage which has a linkage arrangement 16 on both sides with respect to a vertical longitudinal center plane of the vehicle, the linkage arrangements 16 being pivotably mounted on a main bearing 18 which is arranged in the area of the top storage box and fixed to the vehicle as illustrated in FIG. 7.

Each of the linkage arrangements 16, which serve to stretch a top cover that covers the vehicle interior 12 when the top is in the closed position, extends through a linkage exit opening 20 when in said closed position, the linkage exit openings 20 being formed in a vehicle trim 22 to the forward side of the top box lid 14. This is illustrated by dashes in FIG. 5. When the top is in the storage position, the linkage arrangements 16 are accommodated in the top storage box. In order for the convertible vehicle to have a pleasant appearance when the folding top is in the storage position, the linkage exit openings 20 can each be closed by means of a cover 24.

The covers 24 and the linkage exit openings 20 are mirror-symmetrical relative to the vertical longitudinal center plane of the vehicle and hence, for the sake of clarity, will be described below with reference to only the cover 24 arranged on the left with respect to the direction of forward travel of the vehicle. The cover arranged on the right with respect to the direction of forward travel of the vehicle is obvious by analogy.

As can be seen in FIGS. 3 to 7, each cover 24 comprises a panel 26, whose outline is substantially rectangular and corresponds to the outline of the respective linkage exit opening 20. The panel 26 has a support at each of its longitudinal edges, which extend in the longitudinal direction of the vehicle, each support having a slider arrangement 28, which is guided in a respective guide rail 30A and 30B. Guide rail 30A is arranged on the inside with respect to the vertical longitudinal center plane of the vehicle, and guide rail 30B is arranged on the outside with respect to the vertical longitudinal center plane of the vehicle. The guide rails 30A and 30B are part of a support frame 31 fixed to the vehicle, allowing the covers 24 to be mounted on the vehicle as a unit in each case.

Figure 3:
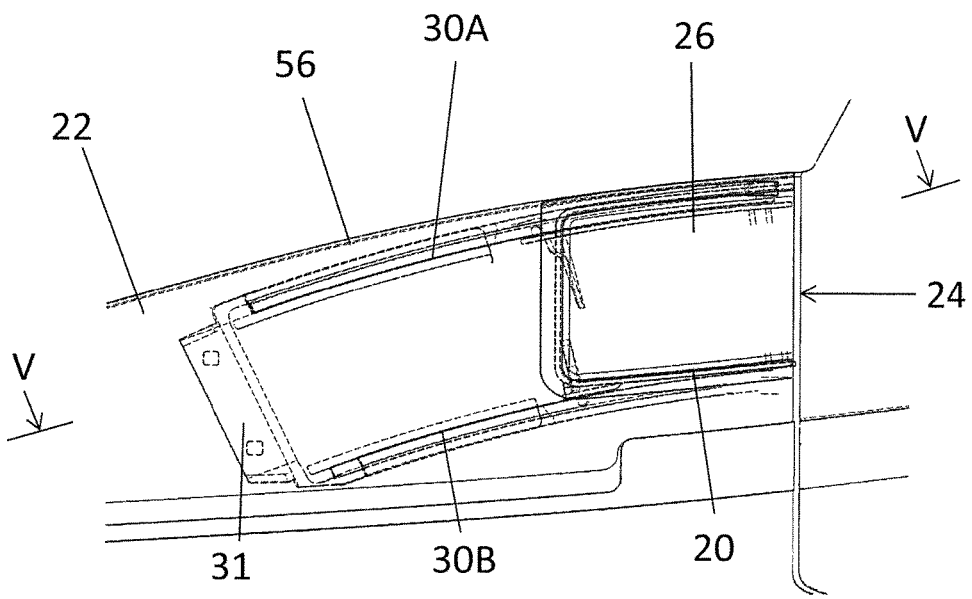
FIG. 3 shows a top view of a portion III in FIG. 2, in which a cover for the linkage exit opening is formed, its panel being in the cover position.
Figure 4:
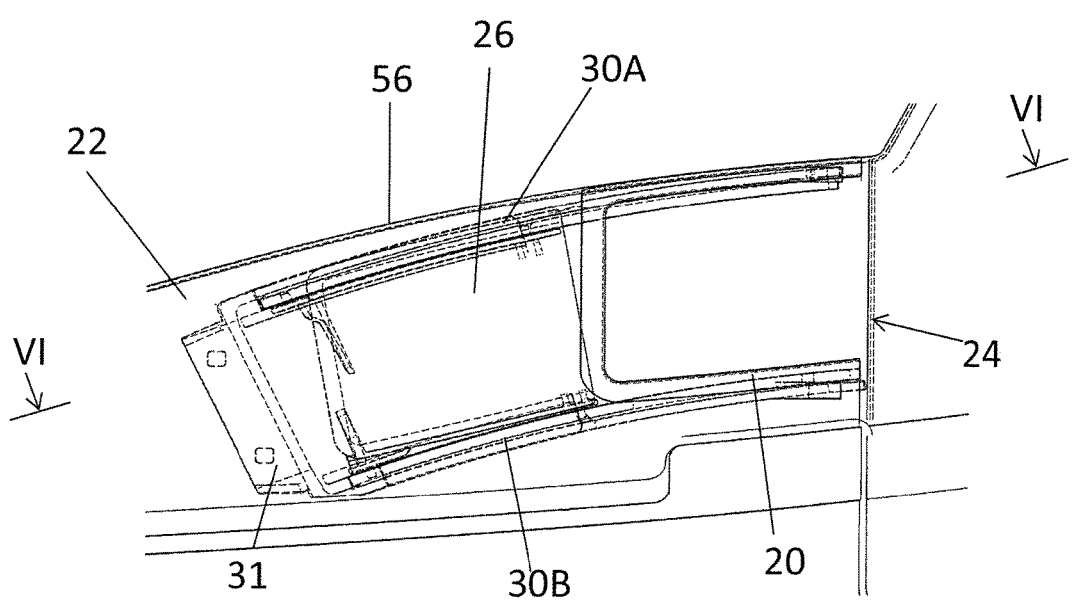
FIG. 4 shows a view corresponding to FIG. 3, with the panel being in an open position.

As can be seen in particular in FIGS. 3 and 4, the guide rails 30A and 30B are curved, the panel 26 thus being guided on a curved track in the direction of the vehicle front and, with respect to the vertical longitudinal center plane of the vehicle, outward in the transverse direction of the vehicle when being displaced from its cover position, illustrated in FIG. 3, into the open position, illustrated FIG. 4. The guide rails 30A and 30B each have a first section A, which runs along the respective edge of the linkage exit opening 20 that extends in the longitudinal direction of the vehicle, and a section B, which is arranged to the front side of the linkage exit opening 20 and in which the panel 26 is arranged when in its open position.

The slider arrangements 28 of the panel 26, arranged inside and outside and formed on the respective panel support, each comprise a first slider 32 and a second slider 34, each of which is guided in a guide track 36 and 38, respectively, of the respective guide rail 30A and 30B, respectively. Each of the two guide tracks 36 and 38 has a rear-side end section 40 and 42, respectively, which is inclined in relation to the horizontal and dips in the direction of the vehicle front when the vehicle is in a horizontal position, and adjacent thereto a horizontally aligned displacement section 44 and 46, respectively. The end sections 40 and 42 serve to displace the panel 26 in the vertical direction of the vehicle, allowing the panel 26 to be moved below the vehicle trim 22 in the displacement sections 44 and 46 when the panel is being moved into the open position.

The open position of the panel 26 is realized when the folding top is in the closed position, in which the linkage arrangements 16 extend through the linkage exit openings 20 (cf. FIGS. 6 and 7). The cover position of the panels 26 is realized when the folding top is in the storage position, in which the folding top is accommodated in the rear-side top storage box (cf. FIGS. 1 to 3 and 5).

In order to be able to displace the panels 26 between the open position and the cover position, a coupling link 50 is linked to each of them via a hinge point 48, the coupling link 50 being connected to a drive link 54 via a hinge point 52, the drive link 54 being coupled with the respective linkage arrangement 16. The linkage arrangement 16, which is driven by means of a hydraulic cylinder 55, thus forms a drive device for the panel 26. Alternatively, a separate drive motor may be provided for the panel.

When the panel 26 is being displaced from the cover position into the open position on the curved track defined by the guide rails 30A and 30B, the panel 26 is turned about a panel normal. The curved track, which is defined by the guide rails 30A and 30B, follows an inner beltline 56 of the vehicle trim 22. The inner beltline 56 defines the shoulder room for passengers on a rear bench 58 or on back seats. When in the open position, the panels 26 are arranged below the vehicle trim 22 beside the convertible vehicle's 10 rear passenger compartment, which is formed by the rear bench 58.

The invention claimed is:

1. A convertible vehicle having a top displaceable between a closed position, in which it covers a vehicle interior, and a storage position, in which the vehicle interior is open toward the top, and which comprises:

a top linkage, which, on both sides with respect to a vertical longitudinal center plane of the vehicle, extends through a linkage exit opening of a vehicle trim when the top is in the closed position, each of the linkage exit openings on both sides being provided with a cover, the cover comprising a panel which can be displaced between a cover position, in which it covers the linkage exit opening, and an open position, in which the linkage exit opening is open, wherein each cover comprises a guiding device, which guides the respective panel on a curved track in the direction of the vehicle front and outward in the transverse direction with respect to the vertical longitudinal center plane of the vehicle when the panel is displaced from the cover position into the open position.

2. The convertible vehicle according to claim 1, wherein the guiding device comprises two guide rails, each of which is engaged by a slider arrangement of the panel and which are preferably part of a support frame fixed to the vehicle.

3. The convertible vehicle according to claim 2, wherein each guide rail has two guide tracks, each of which is engaged by a slider of the respective slider arrangement.

4. The convertible vehicle according to claim 2, wherein, in sections, the guide rails run along the edges of the linkage exit opening that extend in the longitudinal direction of the vehicle.

5. The convertible vehicle according to claim 2, wherein the guide rails have a course that follows an inner belt line of the vehicle trim.

6. The convertible vehicle according to claim 1, wherein the panel, when in the open position, is located below the vehicle trim be-side a vehicle rear bench.

7. The convertible vehicle according to claim 1, wherein the panel, when in the open position, is turned by approximately 25° to 50° about a panel normal in relation to its cover position.

8. The convertible vehicle according to claim 1, comprising a drive device that drives the panel via a coupling link.

* * * * *